June 15, 1965   W. M. SIMPSON   3,189,345
WALKER AND LIFTING DEVICE
Filed Oct. 2, 1962   10 Sheets-Sheet 1

INVENTOR.
WALTER M. SIMPSON
BY
*Rupert J. Brady*
ATTORNEY

June 15, 1965  W. M. SIMPSON  3,189,345
WALKER AND LIFTING DEVICE
Filed Oct. 2, 1962  10 Sheets-Sheet 7

INVENTOR.
WALTER M. SIMPSON
BY
*Rupert J. Brady*
ATTORNEY

June 15, 1965  W. M. SIMPSON  3,189,345
WALKER AND LIFTING DEVICE
Filed Oct. 2, 1962  10 Sheets-Sheet 9

INVENTOR.
WALTER M. SIMPSON
BY
ATTORNEY

FIG. 22

United States Patent Office 3,189,345
Patented June 15, 1965

3,189,345
WALKER AND LIFTING DEVICE
Walter M. Simpson, Evansville, Ind., assignor to Seven E Corporation, Evansville, Ind., a corporation of Indiana
Filed Oct. 2, 1962, Ser. No. 227,882
19 Claims. (Cl. 272—70.4)

This invention relates to a walking assist and lifting device for supporting, exercising, lifting and transferring from one place to another incapacitated or handicapped persons who do not have complete use of their limbs or muscles.

One of the objects of the invention is to provide a construction of a combination walker and lift device which may be operated manually or automatically by the person attending the patient using the device, or which may be operated automatically by the patient himself while using the device.

Another object of the invention is to provide a construction of a combination walker and lifting device which can be completely operated and manipulated by the patient using the device and which enables the user to independently lift, transport and exercise himself without the assistant of an attendant.

Another object of the invention is to provide a construction of a lifting device for incapacitated or handicapped persons in which the weight of the user is uniformly distributed between parallel pairs of lifting arms by a novel arrangement of lifting gearing.

Still another object of the invention is to provide a construction of a combination walker and lifting device which can be easily and quickly adjusted in width to comfortably fit an individual user without the use of tools.

A further object of the invention is to provide a construction of lifting device for handicapped, incapacitated persons, or the like, in which novel means are employed in the lifting mechanism for counterbalancing the weight of the user.

Still a further object of the invention resides in the arrangement for preventing over-travel of the lifting-support arms during automatic operation thereof.

Other and further objects of the invention reside in the mechanism for changing operation of the combination walker and lifting device from manual to automatic operation, the manner in which additional width adjustment can be obtained by interchanging the supporting arm heads, the arrangement of the motor control and battery charging circuit, the construction of the modified support frame for residential use, the modified lifting gearing arrangement, the adaptability of the device for supplying stretching force for surgical, orthopedic and therapeutic uses, and in the adaptability of the device for supporting the user by means of an abdomen belt, sling, etc., and/or various other accessories. These and other objects of the invention are set forth more fully and will become apparent from a study of the specification hereinafter following by reference to the accompanying drawings, in which:

FIG. 12 is a front elevational view partly in section of the support head and hand grip mechanism, the view being taken substantially along line 12—12 of FIG. 3;

FIG. 12A is a view similar to FIG. 12 but showing the support head in reverse position to provide additional width adjustment;

FIG. 13 is a fragmentary vertical sectional view taken substantially along line 13—13 of FIG. 12;

FIG. 14 is an enlarged sectional view of the locking clip shown in FIG. 13, and particularly showing the clip in unlocked position and the manner in which the support assembly is connected to the support arms;

FIG. 15 is a top elevational view partly in section of the locking clip mechanism shown in FIG. 14;

FIG. 16 is a fragmentary top plan view showing the support heads and particularly showing the manner in which supporting chest and back bands can be attached to the support head assemblies for maintaining the patient in position over the support heads, the view having portions broken away for clearer illustration;

FIG. 17 is a side elevational view of a modified support assembly for use with abdomen belts, slings, etc., and the like;

Figure 1:
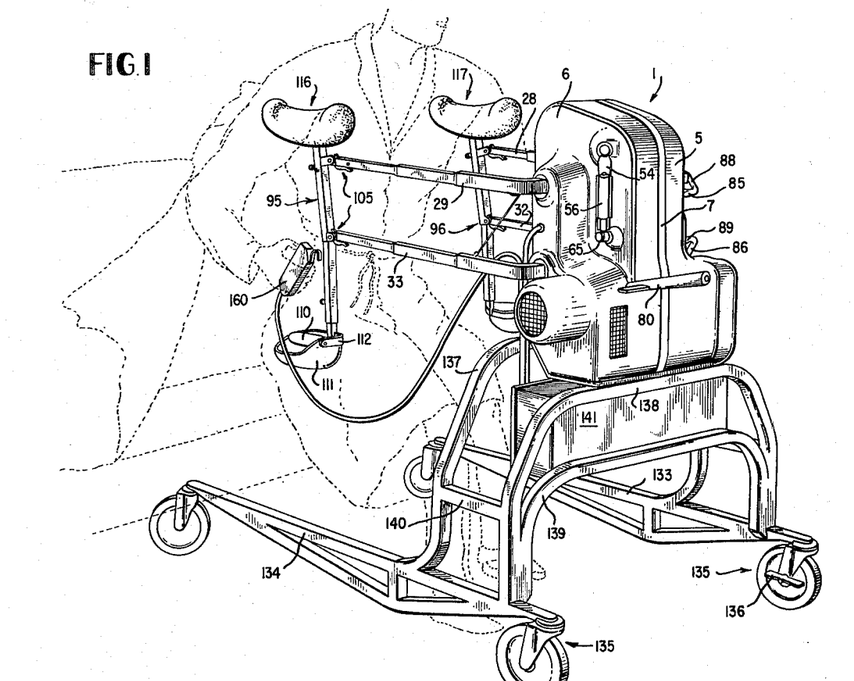
FIG. 1 is a perspective view of the combination walking assist and lifting device of the invention.

In the drawings, wherein for the purpose of illustration is shown a preferred embodiment of the invention, attention is directed first to FIG. 1 which shows the combination walking assist and lift device of the invention as a whole, and illustrates in dotted lines the manner in which a user would manipulate the device to raise himself from a sitting position on the edge of a bed or the like to standing position. Attention is also directed simultaneously to the housing assembly structure for the lifting gearing mechanism shown in FIGS. 2–5.

The housing assembly indicated generally at 1 is comprised of the housing sections 2 and 3 secured together by suitable means such as bolts 4. The housing sections are castings and when the entire device is assembled the housing sections 2 and 3 and their associated components are covered by outer cover sections 5 and 6, respectively, secured to the housing sections by means of screws or the like, which are covered by the finishing strip 7. The outer cover sections 5 and 6 may be constructed of lightweight metal, plastic, fiber glass, etc., and for the purpose of rendering a more aesthetic appearance to the housing assembly. In lieu of separate housing sections 2 and 3 and separate outer cover sections 5 and 6, for more economical manufacturing the outer cover sections may carry the various bearing surfaces provided by the housing sections as integral parts thereof, thus eliminating the separate housing members 2 and 3. With the housing sections formed in this manner the cover sections are preferably formed as castings or the like, of heavier material, rather than of plastic or the like.

Figure 4:
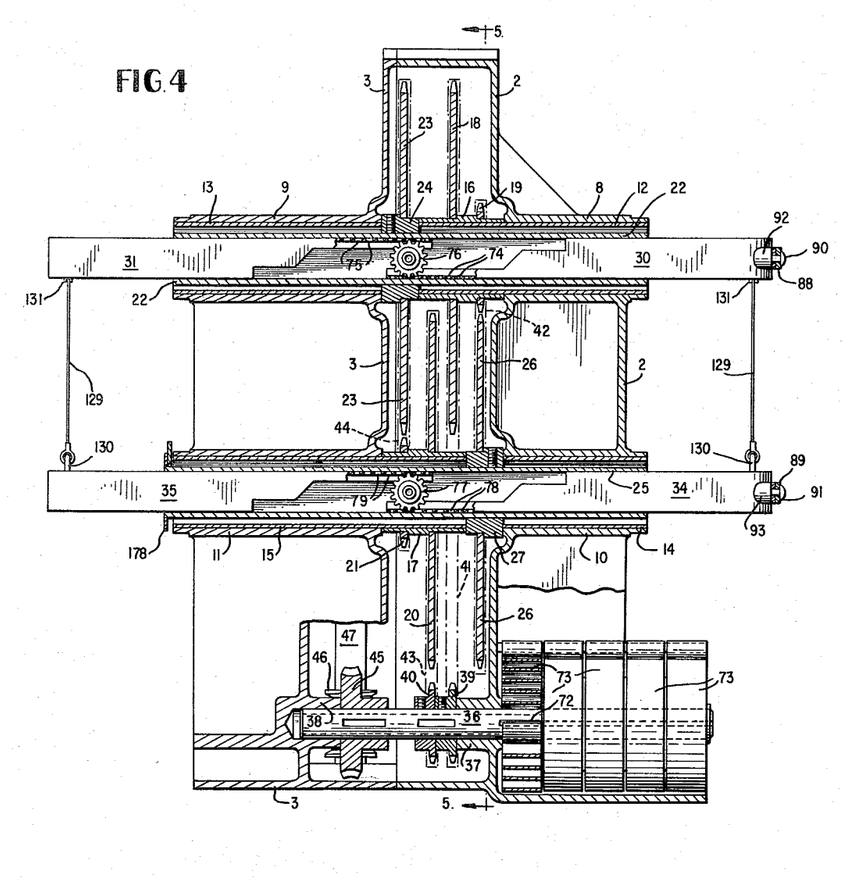
FIG. 4 is a vertical sectional view taken substantially along line 4—4 of FIG. 3.

Upper bearings 8 and 9 are provided by housing sections 2 and 3, respectively, in axial alignment, and lower bearings 10 and 11, respectively, in similar alignment, positioned somewhat therebeneath. Bearing sleeves 12, 13, 14 and 15 are respectively journaled in upper bearings 8 and 9 and lower bearings 10 and 11. Bearing sleeves 12 and 15 are disposed to extend somewhat inwardly of the housing, as shown in FIG. 4, to provide bearing surfaces for intermediate sprocket gear hubs 16 and 17 respectively journaled thereon. Intermediate sprocket gear hub 16 carries a large sprocket 18 and a small sprocket 19 rigidly connected thereto, by means of welding or the like, and lower intermediate sprocket gear hub 17 carries a similar large sprocket 20 and a small sprocket gear 21 integrally connected thereto by means of welding or the like. With this arrangement intermediate sprocket assembly 16, 18, 19 is free to rotate upon bearing sleeve 12, and intermediate sprocket assembly 17, 20, 21 is free to rotate upon bearing sleeve 15.

Figure 5:
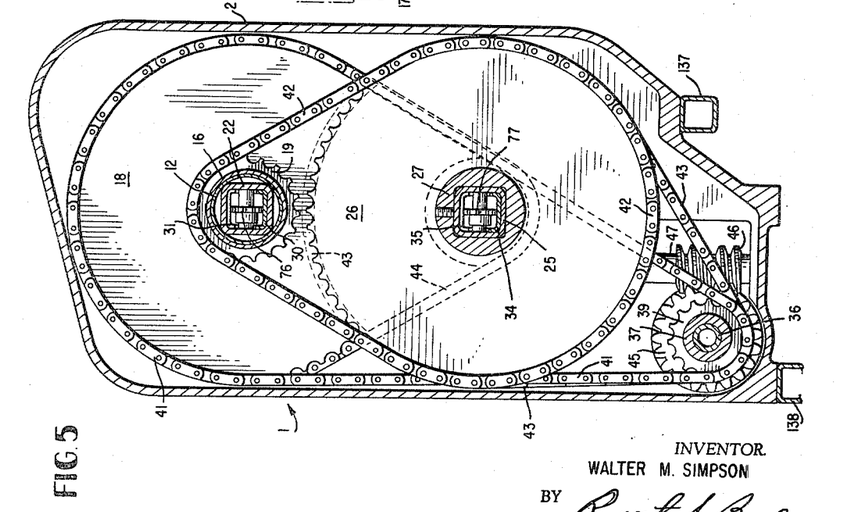
FIG. 5 is a vertical section view taken substantially along in 5—5 of FIG. 4; and particularly showing the arrangement of the lifting gearing.
Figures 6, 7, 8:
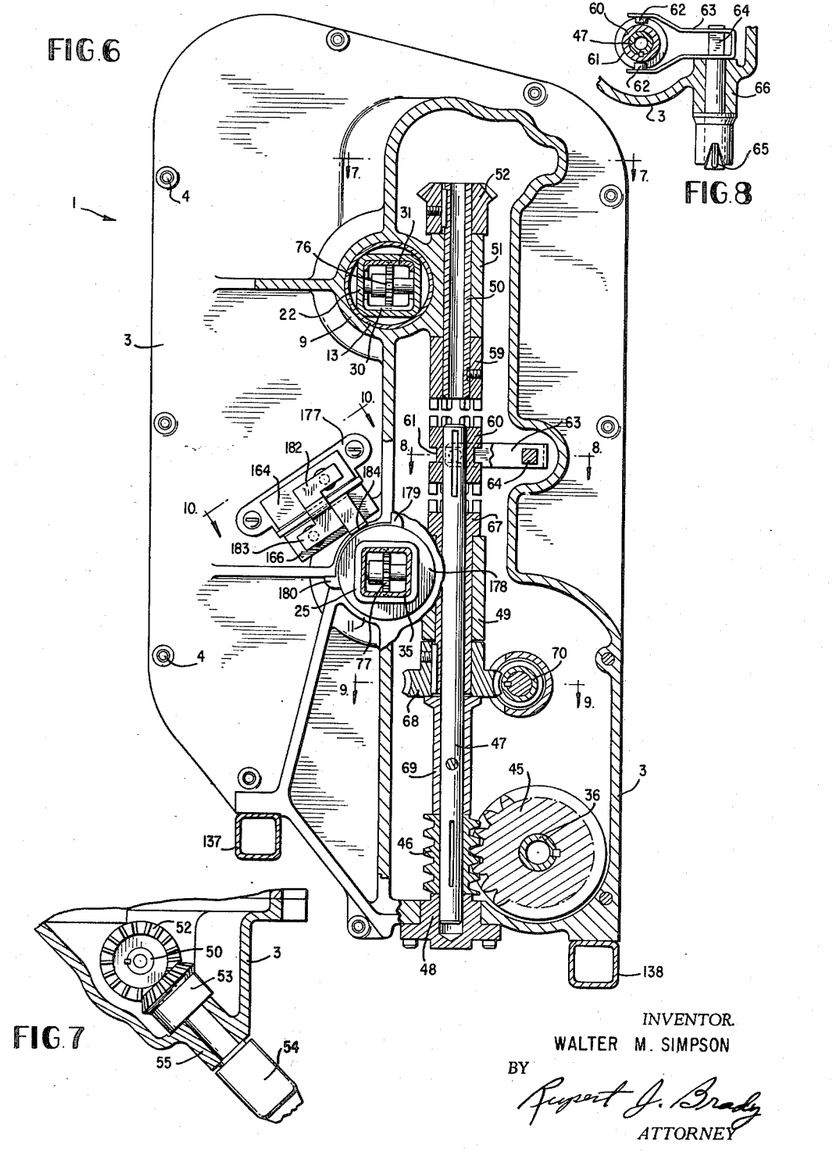
FIG. 6 is an enlarged vertical sectional view, partly in elevation, and particularly showing the arrangement of the clutch mechanism and the support arm limit switches.
FIG. 7 is a fragmentary horizontal sectional view taken substantially along line 7—7 of FIG. 6.
FIG. 8 is a fragmentary horizontal sectional view taken substantially along line 8—8 of FIG. 6, and particularly showing the arrangement of the movable clutch member.

An upper tubular member 22 of generally square shaped cross-section, as particularly shown in FIGS. 4–6, is axially disposed within bearing sleeves 12 and 13 which are rigidly staked to tubular member 22 by means of punching, welding or the like. Upper load sprocket wheel 23, of similar size as sprocket 18, is rigidly connected to a hub 24 which in turn is rigidly connected to upper tubular member 22 intermediate the ends of bearing sleeves 12 and 13. In similar manner lower tubular member 25 of generally square shaped cross-section is disposed axially within bearing sleeves 14 and 15 which rigidly are staked thereto, and lower load sprocket wheel 26 is rigidly connected to hub 27, which in turn is rigidly connected to lower tubular member 25, in a suitable manner such as with set screws, welding, or the like, intermediate the inner ends of bearing sleeves 14 and 15.

A pair of upper tubular support arms 28 and 29, having a generally square cross-section, extend substantially laterally forwardly from the housing assembly 1 and are supported in upper tubular member 22 by support arm portions 30 and 31 respectively, disposed substantially at right angles to the forwardly extending portions of the arms. In like manner, as shown more particularly in FIGS. 1 and 3, a pair of lower tubular support arms 32 and 33, generally square in cross-section, extend laterally forwardly of the housing assembly 1, in parallel relation to upper tubular support arms 28 and 29, and are supported in lower tubular member 25 by support arm portions 34 and 35 respectively, disposed generally at right angles to the forwardly extending portions of the lower support arms. The upper and lower pairs of support arms and the manner in which they are supported in the housing assembly are explained more fully further on in the present specification.

A horizontally disposed shaft 36 is journaled in bearings 37 and 38, respectively, carried in the lower portions of housing sections 2 and 3, and a pair of small drive sprockets 39 and 40 are rigidly connected thereto in vertical alignment with large intermediate sprockets 18 and 20, respectively. A drive sprocket chain 41, of the endless type, is disposed about drive sprocket 39 and large intermediate sprocket gear 18, and endless sprocket chain 42 is disposed about small intermediate sprocket gear 19 and lower load sprocket wheel 26. Lower arm drive sprocket chain 43, of the endless type, is disposed between drive sprocket 40 and large intermediate sprocket 20, and endless sprocket chain 44 is disposed between small intermediate sprocket gear 21 and upper load sprocket 23. With this arrangement the lifting force provided by drive sprockets 39 and 40 is mutually distributed to the upper and lower drive sprocket wheels, and thus is mutually distributed to the pairs of upper and lower tubular support arms. For purposes of clarity in illustration the sprocket chains have been shown in dot-dash lines in FIGS. 4 and 5.

A worm gear 45 is keyed to horizontal shaft 36 adjacent one end thereof, and is disposed to be driven by worm 46 keyed to vertical shaft 47 which is rotatively supported in bearings 48 and 49 carried by housing section 3. A second vertical shaft 50, as shown in FIG. 6, is supported in housing section 3 by bearing 51 and is disposed in axial alignment with vertical shaft 47, with the lower terminating end thereof spaced somewhat above the upper end of shaft 47. A bevel gear 52 is rigidly keyed to the upper end of shaft 50 and is disposed in meshing relation with a cooperating bevel gear 53 connected to crank member 54 journaled for rotation in bearing 55 carried by the upper portion of housing section 3, as shown more particularly in FIG. 7. The manual crank 54 is disposed exterior of the housing assembly at a location convenient for an attendant to manually rotate the crank, to manually raise and lower, by means to be described, the parallel support arms. The manual crank member 54 includes a handle portion 56 pivoted to crank 54 at 57 and a spring is provided at the pivot junction so that handle 56 can be folded up against crank 54, as shown in FIG. 1, when the crank is not in use. The handle portion 56 is shown pivoted to the position for use in FIG. 2.

Figure 2:
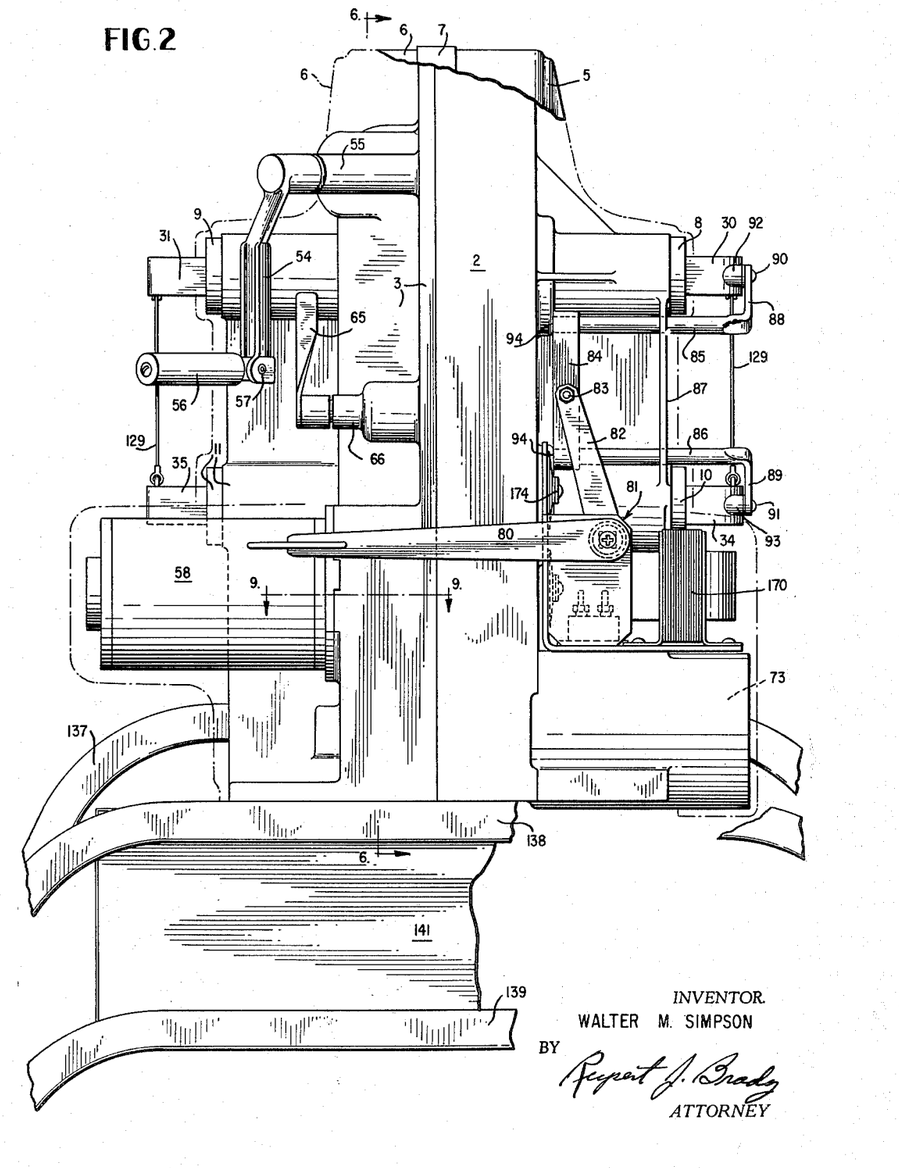
FIG. 2 is an enlarged back elevational view of the housing assembly, partly broken away and with the cover removed but showing the positioning of the cover in dot-dash line.
Figure 9:
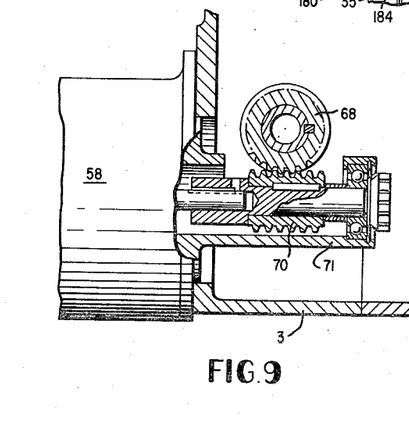
FIG. 9 is a fragmentary horizontal sectional view, partly in elevation, taken substantially along line 9—9 of FIGS. 2 and 6, and particularly showing the arrangement of the motor drive mechanism.

As shown in FIG. 6 a clutch mechanism is connected for selectively joining shafts 50 and 47 for manual operation of the device by rotation of crank member 54, or for disconnecting shafts 50 and 47 for automatic operation of the device by electric motor 58 supported on housing section 3 as shown more particularly in FIGS. 2 and 9. A manual operation clutch member 59, of cylindrical form, is rigidly connected to the end of vertical shaft 50 for rotation therewith and is provided with a plurality of depending spaced clutch teeth. A tubular shiftable clutch member 60 is disposed about the upper end of vertical shaft 47 and is keyed for rotation therewith, as particularly shown in FIGS. 6 and 8, but is free to be vertically shifted upwardly and downwardly on said shaft. A groove 61 is provided about the perimeter of shiftable member 60 and a pair of lugs, connected to shifting yoke 63 which in turn is connected to shaft 64 of clutch shifting lever 65 journaled in bearing 66 of housing section 3, are engaged in groove 61 for shifting clutch member 60 upwardly when clutch lever 65 is rotated clockwise, and for shifting clutch member 60 downwardly when clutch lever 65 is rotated counterclockwise. Shiftable clutch member 60 carries a plurality of spaced clutch teeth on both its upper and lower surfaces for engagement with the clutch teeth of the cooperating clutch members 59 and 67, and is shown in the neutral position in FIG. 6.

The automatic operation clutch member 67 is comprised of a tubular bearing sleeve disposed about shaft 47 and carrying a plurality of upwardly extending spaced clutch teeth for cooperative selective engagement with the downwardly extending teeth of shiftable clutch member 60. Clutch member 67 is rotatably disposed in bearing 49 and is free to rotate with respect to shaft 47. A worm gear 68 is rigidly keyed to the lower portion of the sleeve of clutch member 67 as shown, and is disposed for rotation therewith, with clutch members 67 and worm gear 68 being maintained in position upon shaft 47 by spacer member 69 rigidly connected to said shaft. Worm gear 68 is driven by a cooperating worm 70 which is connected to and rotated by the shaft of motor 58 and which is journaled in a bracket 71 carried by the motor housing. During automatic operation shiftable clutch member 60 is shifted downwardly into engagement with automatic operation clutch member 67 and shaft 47 is rotated by motor 58 through members 70, 68, 67, 60, and thence to shaft 47 through the key connection of member 60 thereto. Very efficient operation of the device according to the invention has been obtained by selection of worm gear rations and ratios in the sprocket gearing chain such that a 3600 r.p.m. motor 58 inparts approximately ⅓ r.p.m. movement to the upper and lower tubular members 22 and 25. The driving worm gears 45 and 46 due to the action of worm gears act as a locking means for maintaining the upper and lower tubular support arms in raised position so that the load supported by the arms does not cause counter-rotation of the gear trains.

Figure 3:
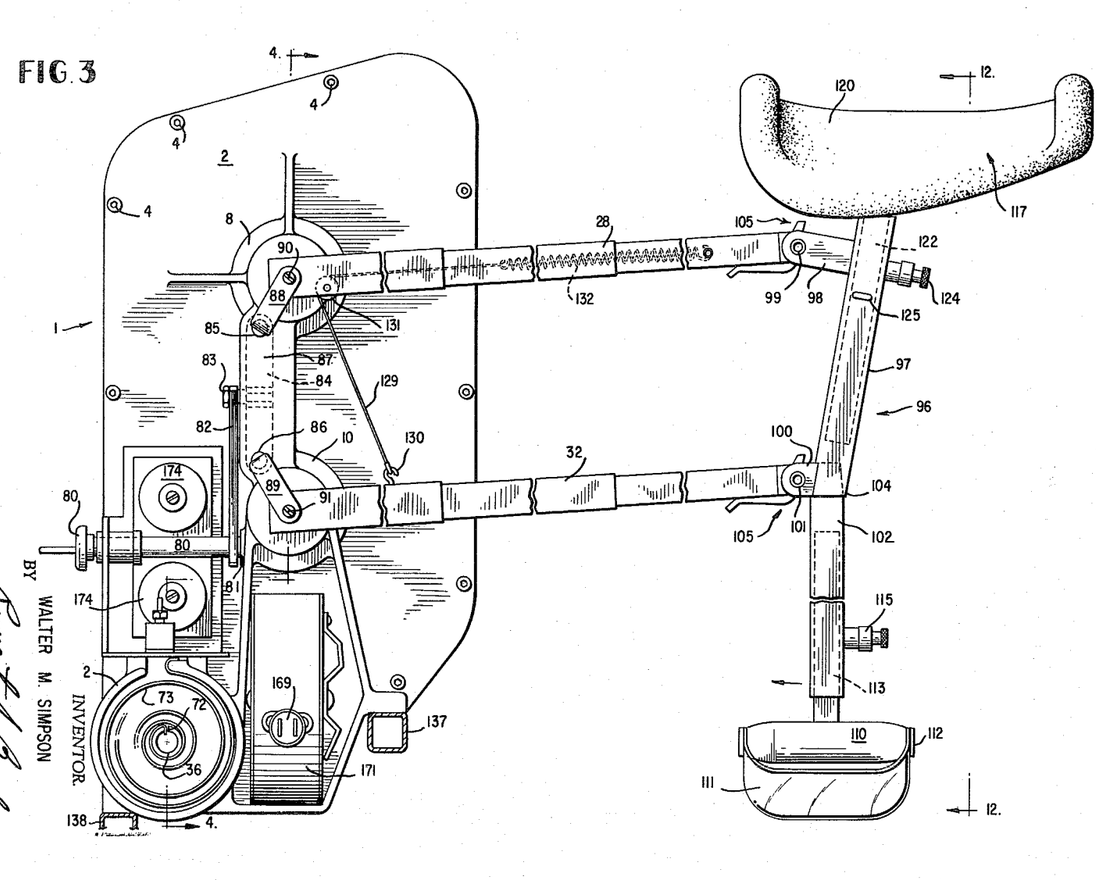
FIG. 3 is a side elevational view of the housing assembly, on a scale somewhat reduced from that of FIG. 2, with parts in section and with parts foreshortened, and particularly showing the arrangement of the lifting arm support mechanism.

The end of horizontal shaft 36 oppositely disposed from worm gear 45 is provided with an elongated slot 72 therein as shown in FIGS. 3 and 4, and a plurality of spiral load springs 73, one of which is shown in section in FIG. 4, are disposed about horizontal shaft 36 with their inner ends anchored in slot 72 and their outer ends anchored to housing section 2 by appropriate means, such as hooking the outer terminating ends of the springs over a portion of the housing. The load springs are constructed of spring steel or the like, and any appropriate number can be provided depending upon the load requirements of the device, and it is to be understood that a single wide load spring can be provided in lieu of a plurality of relatively thin load springs as indicated in FIG. 4. These springs exert a torque on shaft 36 and thus on the lifting gearing which is counter to rotation which might be imparted to the gear trains by the load presented by the user supported on the pairs of arms 28–29 and 32–33. Thus the springs have the effect of counterbalancing the load exerted on the arms through the gear trains.

As previously stated the upper and lower tubular members 22 and 25 of the lifting arm mechanism, are generally square in cross-section, and the tubular support arms 30, 31, 34, and 35 are of a smaller square cross-section and are inserted in opposite ends of the corresponding tubular members as shown in FIG. 4, and are disposed in sliding engagement with the interior walls thereof. The corresponding inner ends of upper support arm portions 30 and 31 are oppositely tapered or stepped, as shown in FIG. 4, so that the inner ends may overlie each other, with the end extremity of each arm portion presenting substantially a single wall portion having a plurality of axially aligned apertures 74 and 75, respectively, therein. A small sprocket of a diameter substantially the same as the diameter of arm portions 30 and 31, is journalled to the side walls of tubular member 22, as shown more particularly in FIGS. 5 and 6, and is freely rotatable within the tubular member and is adapted to engage the oppositely disposed apertures 74 and 75. In a similar manner the inner ends of lower support arm portions 34 and 35, are oppositely tapered or stepped, and a small sprocket 77, similar to sprocket 76, is journalled for rotation within tubular member 25 and is adapted to simultaneously engage the plurality of oppositely disposed aligned apertures 78 and 79 in the terminating end walls of arm portions 34 and 35 respectively, in a similar manner as described for the upper arm support system. These sprocket wheels 76 and 77 and the manner in which they engage the apertures in their respective arm portions 30–31 and 34–35, constitute a portion of the width adjust mechanism of the device for individually adjusting the width between the pairs of upper and lower tubular support arms 28–29 and 32–33 for the size of the individual person using the device.

The means for automatically adjusting the width of the device without the aid of tools or the like, further includes a width adjust lever 80, pivoted in a suitable manner to housing section 2 as indicated at 81 and having a crank arm 82 rigidly connected thereto and extending upwardly, with its terminating end connected in pivotal engagement at 83 with the slide rod spacer and connecting member 84. A pair of laterally extending slide rods 85 and 86, which extend in substantially parallel relation to support arm portions 30 and 34 respectively, are disposed in sliding engagement with guide apertures in web portion 87 carried by housing section 2 with a corresponding end of each rod rigidly secured to opposite ends of slide rod spacer and connecting member 84 for lateral movement therewith as a trombone-type slide mechanism. The opposite ends of slide rods 85 and 86 are provided with support arm connecting portions 88 and 89, disposed at substantially right angles thereto, and having the terminating ends thereof pivotally connected at 90 and 91, by means of screws, rivets, or the like, to protruding lugs 92 and 93, respectively rigidly connected to the upper tubular support arm 28 at its junction with support arm portion 30, and lower tubular support arm 32 at its junction with support arm portion 34, the lugs being positioned along the axial centers of the support arm portions 30 and 34, respectively. It should be noted that the pivot connections 90 and 91 are required so as to accommodate the raising and lowering of the support arms and thus prevent binding of the width adjustment mechanism. The smallest width adjustment between the pairs of support arms is obtained when the width adjustment lever 80 is in its extreme counterclockwise position, as substantially shown in FIGS. 1 and 2. Progressively greater widths are obtained between the support arms as the lever 80 is pivoted in a clockwise direction, as shown in FIGS. 1 and 2. As members 80 and 82 are rotated clockwise slide rods 85 and 86 are moved laterally outwardly by connecting member 84 which in turn causes support arm portions 30 and 34 to slide outwardly in tubular members 22 and 25 due to the pulling force exerted thereon by the slide rods through the pivot connections 90 and 91. Since sprockets 76 and 77 are engaged in apertures in arm portions 30–31 and 34–35, respectively, as arm portions 30 and 35 are pulled outwardly sprockets 76 and 77 are rotated upon their journals within tubular members 22 and 25 respectively, and transfer forces to arm portions 31 and 35 causing the same to slide outwardly of tubular members 22 and 25 the same distance as arm portions 30 and 34 respectively. In FIG. 4 the arm portions are shown in their position of substantially maximum width adjustment.

When width adjustment lever 80 is pivoted in a counter-clockwise direction the arm portions 30 and 34 are slid inwardly of tubular members 22 and 25 by a pushing force exerted by slide rod members 85 and 86, and the corresponding arm portions 31 and 35 are drawn inwardly a corresponding distance by the sprocket wheel coupling mechanism. The minimum and maximum width adjustment limits are determined by the abutment of slide rod spacer and connecting member 84 with portions 94 of housing section 2 and web portion 87, respectively. Thus with this arrangement simultaneous width adjustment is imparted to the dual support arm very simply and with a minimum of effort.

A support and hand grip assembly is connected on each side of the device, with the right support and hand grip assembly indicated generally at 95 connected to the terminating ends of tubular support arms 29 and 33, and the left support and hand grip assembly indicated generally at 96 connected to the terminating ends of tubular support arms 28 and 32. These assemblies are substantially identical in construction, except for the supporting head portions, and are comprised of a main supporting tube member 97, FIGS. 3, 12 and 12A, carrying a pair of outwardly extending spaced connecting lugs 98 near the upper extremity thereof, with the lugs carrying connecting tube member 99 rigidly staked therebetween, and a pair of outwardly extending lower spaced connecting lugs 100 near the lower terminating edge thereof carrying connecting tube member 101 rigidly staked therebetween as indicated in FIG. 3. The main supporting tube 97 is provided with a cut out portion intermediate the lower spaced connecting lugs 100 and a lower supporting tube member 102, carrying a pair of outwardly extending spaced ears 103 adjacent the upper edge thereof, as indicated in dotted lines in FIG. 12, fit somewhat inwardly of the lower end of main supporting tube member 97 so that the pairs of ears 100 and 103 lie in side-by-side relation. The ears 103 are apertured to journally engage the connecting tube member 101 therethrough in a manner such that members 102 and 103 are journalled on tube 101 and are free to rotate slightly with respect to main support tube member 97. The lower terminating edge portion 104 of main support tube member 97 forms a forward limit stop for the extent of the forward swing of lower supporting tube member 102.

Figures 12, 12A, 13, 14, 15, 16, 17:
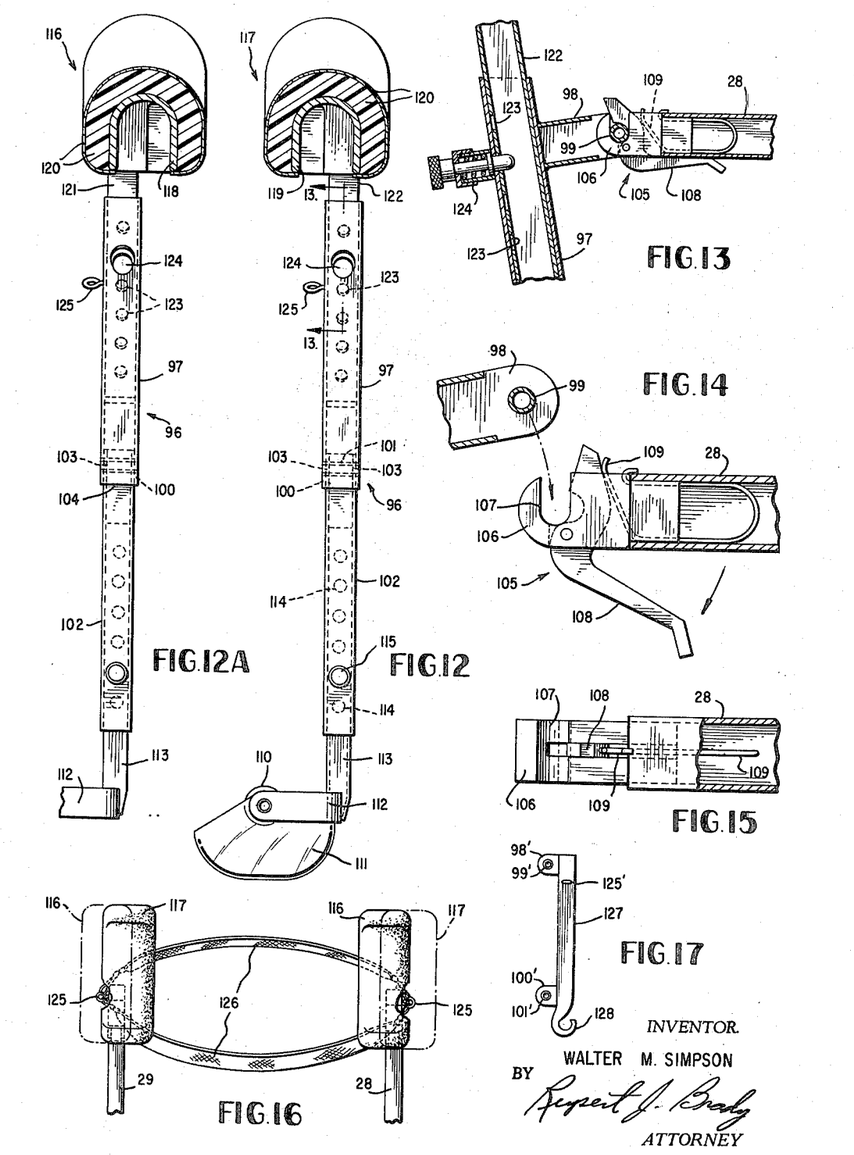

A catch member indicated generally at 105, and shown in greater detail in FIGS. 13–15, is securely connected to the terminating end of each of tubular arm members 28, 29, 32 and 33 to respectively receive the connecting tube members 99 and 101 to lock the support and hand grip assemblies to the appropriate tubular support arms. Each of the catch members 105 comprises a connecting lug 106 rigidly connected in the end of the tubular support arm, with the lug carrying a horizontal recess 107 therein profiled to receive the connecting tube members 99 or 101. A locking member 108 is pivoted in a slot in the connecting lug for locking the connecting tube member in the recess 107. The locking member 108 is normally urged to the locked position by spring member 109. The catch member is shown in the locked position in FIGS. 3 and 13 and in the unlocked position about to receive the connecting tube 99 in FIGS. 14 and 15. In order to unlock the catch it is merely necessary to pull downwardly on locking member 108 as indicated by the arrow in FIG. 14. When the locking member is released, it will be returned to its normally locked position under pressure of the spring 109.

A hand grip assembly consisting of a grip member 110 and a hand protection shield 111 are securely connected to bracket 112 which in turn is securely connected to the end of hand grip support tube 113 by welding or the like. The hand grip support tube 113 carries a series of apertures 114 through the side walls thereof along the length of the tube, and the tube is received in telescoping relation with in the end of lower supporting tube member 102 and is rigidly locked thereto at the desired level by a spring biased plunger member carried by supporting tube 102 adapted to selectively engage the apertures 114 in locking relation. Thus it can be seen that the height of the hand grip assembly can be selectively adjusted to the arm size of the individual using the device.

A pair of support heads 116 and 117, are provided for opposite sides of the device and are received in the upper ends of supporting tube members 97 for engaging the user beneath the arm pits so that he may be lifted and supported in the desired manner. The support heads comprise the head castings 118 and 119 respectively, constructed of cast aluminum or the like, and contoured to comfortably fit beneath the arm of a user, covered with a layer of sponge rubber and fabric 120, or the like, with the head castings rigidly connected to head support tubes 121 and 122 respectively, in oppositely off-set directions from the center lines of the castings, as shown more particularly in FIGS. 12 and 12A. To better fit the user, the head support tubes 121 and 122 intersect the castings at angles of approximately 10° to the vertical as indicated in FIG. 3 so that hand grip assembly may be placed somewhat ahead of the point of supporting contact of the user. The head support tubes 121 and 122 each carry a series of aligned apertures 123 along their lengths, with the tubes disposed in telescopic relation within the main support tube members 97 and locked rigidly therein through engagement of the heads of spring biased plunger members 124 with the apertures 123, thep lunger members being rigidly connected to the main supporting tube members 97 by any appropriate means such as welding, threading, etc. Thus by pulling out on the plunger members 124 the head support tubes 121 and 122 can be adjusted to the desired height for the user and then locked in place by releasing the plunger members. The hand grip assemblies can then be adjusted to comfortably fit the length of the user's arm by pulling outwardly on the spring biased plunger members 115 and then releasing the same when the desired level of the hand grip assembly has been obtained.

The feature of off-setting the head castings 118 and 119 with their respective head support tubes 121 and 122 provides additional width adjustment for the support arms beyond the limits of the width adjust mechanism previously described. The manner in which this additional width adjustment is provided is illustrated in FIG. 16 where the support heads shown in full line are positioned so that their maximum off-set overhangs are inwardly of the tubular support arms to provide a minimum width between the support heads, such as would be required for a very small or thin person. The support heads 116 and 117 are interchangeable between support and hand grip assemblies 95 and 96 so that they may become positioned as shown in dotted lines in FIG. 16, with their off-set overhung portions extending outwardly of the tubular support arms to give the maximum width between the support heads. Such an adjustment in conjunction with the maximum width adjustment provided by lever 80 might be necessary for a very large person. The interchange feature of support heads and the width adjustment mechanism can thus comfortably accommodate the individual width of a user no matter what his size.

A pair of attaching eyelets 125 may be rigidly connected to the supporting tube members 97 to accommodate supporting webs or belts 126, as shown in FIG. 16, connected thereto by spring clips, or the like, for loose engagement about the front and back portions of the user such that if the user tends to fall while using the device his travel is restricted by the supporting webs 126 so that the supporting heads will always be substantially in supporting alignment beneath the user's arm pits, thus eliminating the possibility that he will fall off of the device. The attaching eyelets 125 may also be used for attaching other accessories such as abdomen belts, and other special supports, and the like, which may be necessary for a particular individual or for a particular application.

When the supporting heads and hand grips are not required for a particular application the entire right and left supporting and hand grip assemblies 95 and 96 may be removed from the tubular support arms by releasing the catch members 105 and inserting in their place the accessory support members 127, shown in FIG. 17, which are very similar to main support tube members 97 but carry a hook portion 128 formed on the lower end thereof which can be utilized for special lifting applications. The accessory support tube member carries lugs, connecting tubes, and ears in the same manner as main supporting tube member 97 and is therefore connected to the tubular support arms in the same manner, and in FIG. 17 the correspondingly similar connecting members have been indicated in prime numbers corresponding to similar numbered components in FIGS. 3 and 12. The accessory support tube members 127 also carry attaching eyelets 125' in the same manner as the support tubes 97 and this member is used for such accessories as abdomen belts, supporting slings and swings, supporting commode seats for transporting a patient, and for connecting a wide variety of other accessories to the device for special lifting, transporting, stretching, etc., operations.

The support and hand grip assemblies may be modified from the arrangement shown particularly in FIG. 12, so that the hand grips 110 are angled further outwardly from the supporting tubes to give better hand support and to enable more pressure to be taken off of the shoulders and put on to the hands of the user. This can easily be done by changing the positioning of the attaching lugs and ears on members 97, and the locking plunger members 124 and 115 so as to increase the horizontal distance between the vertical center lines of the hand grips 110 and head supports tubes 121 and 122.

It has been found in some models that when a load is placed on the support heads a torque is applied to the support arms 28, 29, 32 and 33 which is transferred to the arm portions 30, 31, 34 and 35 and causes a binding within the upper and lower tubular members 22 and 25 thus preventing efficient operation of the width adjustment mechanism with the width adjustment lever 80. In order to relieve the torque between the support arm portions and the upper and lower tubular members 22 and 25 small stainless steel cables 29 are connected in an appropriate manner, such as by hooks 130, to the top surfaces of support arms 32 and 33 at a position outwardly spaced from their intersections with arm portions 34 and 35, respectively, with the cables extending upwardly through openings in the bottom of support arms 28 and 29, around sheaves 131 journalled therein at positions immediately adjacent the intersections of support arms 28 and 29 with arm portions 30 and 31. From thence the cables 129 extend forwardly through the centers of support arms 28 and 29 and are connected to tension springs 132 which have their opposite ends anchored to said arms adjacent the terminating ends thereof in close proximity to the catch members 105. By selecting the appropriate angle for the cables extending between the pairs of arms 28, 32 and 29, 33 any twisting torque may be removed from said arms.

Figure 18:
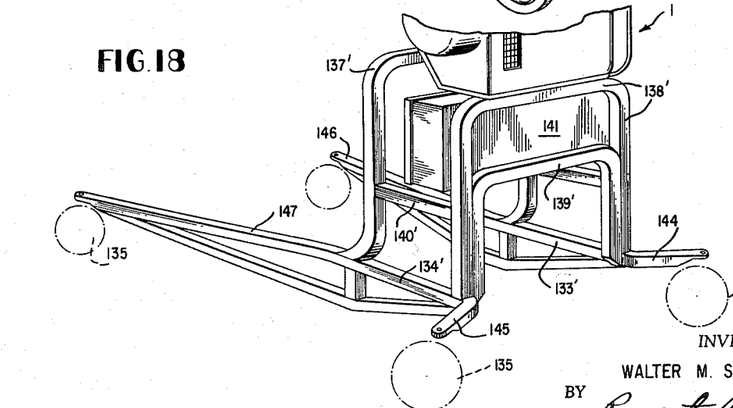
FIG. 18 is a partial perspective view of the device according to the invention, with parts omitted for greater clarity, and particularly showing a modified wheeled frame structure for residential use.

The housing assembly 1 is supported on a wheeled frame as particularly shown in FIGS. 1 and 18, with the frame shown in FIG. 1, adapted for hospital, institutional, etc., use, and other uses, where the width of the frame need not be restricted due to small door openings and the like, and with the frame shown in FIG. 18 adapted for residential use and the like, where the device must be able to fit through smaller door openings. The hospital type frame of FIG. 1 is comprised of the substantially straight side members 133 and 134, suitably braced for the required rigidity, and having caster assemblies 135 pivotally mounted on opposite ends thereof with each of the casters being provided with a brake or locking device 136 of conventional design. With this arrangement the casters can be locked so that the frame will not move during a particular type of lifting operation. The side members 133 and 134 are rigidly joined by raised front cross brace member 137 and back cross brace member 138 which form a pedestal mount for the housing assembly 1, with the housing assembly secured to braces 137 and 138 by means of screws or the like. In order to provide the proper rigidity to the frame and pedestal mount an additional reinforcing cross brace 139 may be provided beneath brace 138 and side reinforcing spacer members 140 are arranged to rigidly connect the side portions of braces 137 and 138 as shown. A battery housing or case 141, containing the batteries for the motor actuation circuit, is positioned beneath housing assembly 1 and is connected to brace members 138 and 139 by screws or the like and is provided with a removable front cover to provide easy access to the batteries contained therein.

The side frame members 133 and 134 are spaced apart a suitable distance so that they will straddle the legs of a chair of normal design, thus enabling the unit to be wheeled as close as necessary to a person in the chair for lifting him therefrom to a standing position.

Figures 19, 23:
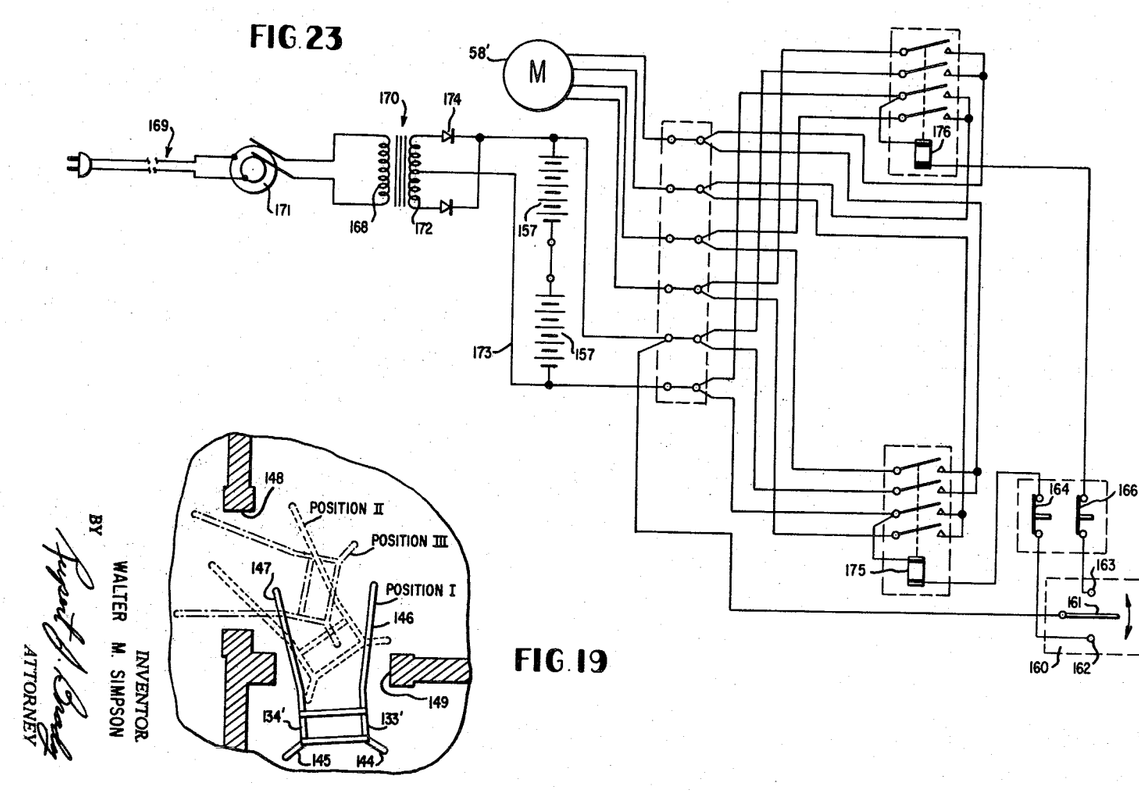
FIG. 19 is a top plan schematic view showing the manner in which the modified frame structure of FIG. 18 is adapted to pass through residential doorways disposed adjacent and at right angles to each other.
FIG. 23 is a schematic wiring diagram of a modified form of electrical circuit for the device.

The residential type wheeled frame member for supporting the housing assembly 1 is shown in FIG. 18 and is substantially comprised of the same type bracing and frame members as shown in the hospital type frame and for purposes of simplicity in explanation, correspondingly similar frame members have been indicated by prime numbers. In the residential frame construction the side frame members are provided with substantially straight portions 133' and 134' spaced together in closer proximity in the area of the pedestal mount for the housing assembly than the corresponding members in the hospital type frame, thus requiring the cross brace frame members 137', 138' and 139' to form a narrower pedestal member for the housing assembly. The straight portions 133' and 134' of the side frame members are provided with frame portions 144 and 145, extending outwardly therefrom at acute angles rearwardly of the pedestal and having caster assemblies 135 pivoted to the end extremities thereof in the same manner as in the hospital type. In similar manner side frame portions 146 and 147 are rigidly connected to the opposite ends of straight portions 133' and 134' and extend forwardly therefrom at acute angles with caster assemblies 135 pivotally connected to their terminating ends. The residential frame arrangement is such that the spacing between opposite pairs of caster assemblies is substantially the same as that for the hospital type frame of FIG. 1, so that the entire device is properly balanced. The forwardly extending side frame portions 146 and 147 are thus spaced at their terminating ends the same distance as side frame members 133 and 134, and are thus adapted to straddle the legs of a normal type chair in the same manner as the hospital type frame. In a residence, or private home, the door openings are much narrower than those encountered in a hospital or the like, and in many instances residences have door openings adjacent each other, and at right angles, as schematically illustrated at 148 and 149 in FIG. 19. In the hospital type frame, wherein the side frame members are disposed parallel to each other, it has been found that this type frame construction cannot pass through smaller residential doors placed in positions such as illustrated in FIG. 19. In order to maintain the entire lifting device in proper balance the casters must be spaced from each other a certain distance, and this dimension cannot be substantially changed. It was therefore found that by making the frame narrower in the area of the housing assembly support pedestal 133'–134' the wheeled frame structure could then easily negotiate residential doors placed adjacent, and at right angles, to each other. The successive progress of the residential type frame through such an arrangement of doors is illustrated by positions I, II and III, in FIG. 19, where it can be seen that when making a turn through the doorways, one side frame portion 147 is first extended into the opening, and then the other frame portion 146 follows as the rear frame portion 144 clears the first door opening.

In lieu of the housing assembly 1 being mounted on a wheeled frame structure, such as shown in FIGS. 1 and 18, it is also to be understood that the housing assembly can be mounted on a stationary type pedestal, such as adjacent a bathtub or the like, where the use to which the lifting device is adapted does not require that the lifting device be wheeled from one place to another or does not require it to transport a user from one place to another.

Figure 20:
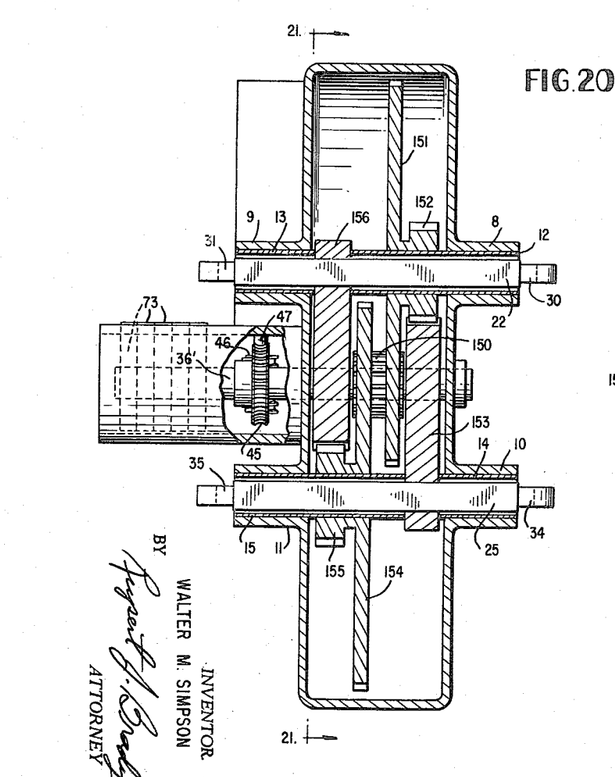
FIG. 20 is a vertical sectional view on a reduced scale, somewhat similar to FIG. 4, and showing a modified form of gearing within the housing assembly.
Figure 21:
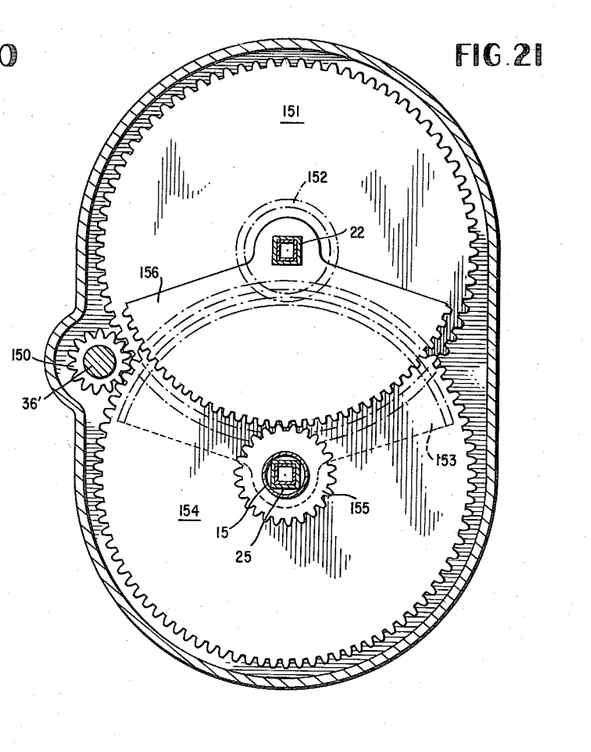
FIG. 21 is a vertical sectional view taken substantially along line 21—21 of FIG. 20.

A modified arrangement of the lifting gear within the housing assembly is schematically illustrated in FIGS. 20 and 21, where in lieu of a chain and sprocket type gearing arrangement, quadrant and spur gears are utilized. In FIGS. 20 and 21 components similar to those in the preferred form of gearing arrangement have been indicated by similar reference characters and primed numerals.

Horizontal drive shaft 36' is journaled in the housing assembly at a location substantially midpoint between upper tubular member 22 and lower tubular member 25. Load springs 73 are connected at one end of the shaft and the shaft is driven through a drive arrangement terminating in worm 46, driving worm gear 45, connected to shaft 36', in the same manner as in the preferred form of the invention. In this form of the invention, the arrangement of the motor drive gearing and the shifting clutch mechanism will be mounted higher on the housing assembly but the general mechanism and its connection with shaft 47 remains substantially the same. Dual pinion gear 150 is rigidly connected to shaft 36' and is rotated as worm gear 45 is driven. A large intermediate spur gear 151 is disposed in meshing engagement with gear 150 and together with small intermediate pinion gear 152 are integrally journaled for rotation upon bearing sleeve 12 journaled in upper bearing 8. Intermediate pinion gear 152 in turn is disposed in meshing engagement with lower shaft quadrant gear 153 rigidly mounted in suitable manner upon lower tubular member 25.

In a similar manner dual pinion gear 150 is disposed in simultaneous meshing engagement with large intermediate spur gear 154 which, together with small intermediate pinion gear 155 are integrally journaled for rotation upon lower bearing sleeve 15 which in turn is journaled in lower bearing 11. Small pinion gear 155 is disposed in meshing engagement with upper shaft quadrant gear 156 which is rigidly connected to upper tubular member 22. With this arrangement, as dual pinion gear 150 is rotated, the intermediate gearing arrangements 151–152 and 154–155 are simultaneously rotated upon their bearing sleeves and respectively drive quadrant gears 153 and 156 to rotate lower tubular member 25 and upper tubular member 22, respectively, to simultaneously drive the pairs of upper and lower tubular support arms supported therein.

Figure 22:
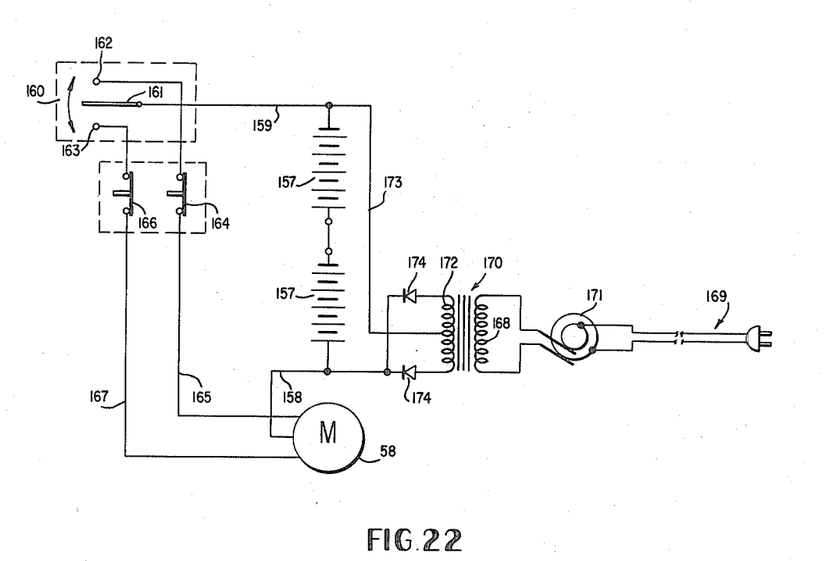
FIG. 22 is a schematic diagram of the preferred electrical circuit of the device of the invention.

The preferred electrical control circuit for the walking assist and lifting device of the invention is shown in FIG. 22. The basic circuit for automatic operation of the device comprises the serially connected batteries 157, which are contained in battery housing or case 141, having one terminal connected through lead 158 to one of the leads of motor 58 and the opposite terminal thereof connected through lead 159 to manually operable push button switch 160, as shown more particularly in FIG. 1, which is remotely located on the end of a flexible cable so that it can be positioned near the end of the tubular support arms in close proximity to the user's hand. The switch may be provided with an appropriate hook for hanging the same at a convenient place near the hand grip assembly so that it is easily accessible by the user for self-operation of the device. Push button switch 160 is of the push-to-make and release-to-break type, having a movable contactor 161 which can be moved into selective contact with either fixed contact 162 or 163. Contact 162 is connected through normally closed lower limit switch 164 and lead 165 to one winding of the motor such that contact between movable contactor 161 and 162 will cause the motor to rotate in a direction to lower the pairs of tubular support arms, and fixed contact 163 is connected through normally closed upper limit switch 166 and lead 167 to motor 58 such that closing of the circuit between movable contactor 161 and fixed contact 163 will cause motor 58 to drive the pairs of support arms in an upwardly direction.

A battery charging circuit is connected across batteries 157 and is comprised of a transformer 170 having its primary winding 168 selectively connectable across a source of A.C. voltage, such as house current, through an electrical plug type lead 169 normally stored in a spring-biased storage reel 171 connected to housing section 2 at a convenient location, as indicated in FIG. 3. The secondary winding 172 of transformer 170 is connected to one terminal of the batteries through lead 173 connected to a center tap thereon and opposite ends of the windings are connected through rectifiers 174 to the opposite terminal of the serially connected batteries 157. Thus the batteries are provided with a convenient charging circuit so that when the device is not in use the power cord 169 may be pulled from reel 171 and plugged into a convenient A.C. outlet to charge the batteries through the rectifier circuit. The device may be used while it is plugged-in if it does not have to be transported from place to place, but in normal use the power cord is retracted into the reel and the motor is automatically actuated from power supplied by the batteries when the switch 160 is selectively operated. As shown particularly in FIGS. 2 and 3 the transformer 170 and rectifiers 174 are mounted at a convenient location on housing section 2 and these components are covered by the outer cover section 5 for a more aesthetic appearance.

The preferred motor actuation circuit of FIG. 22 employs a three-wire motor and a modified circuit for a four-wire motor 58' is shown in FIG. 23 wherein components common to both wire diagrams are represented by similar reference numerals. The wiring arrangement is basically the same except that in lieu of directly energizing the motor windings closing the electric circuit between movable contactor 161 and 162, energizes relay 175 which through its contacts energizes the windings of motor 58' in such manner as to cause the motor to drive the support arms in a downward direction. Closure of the electrical circuit between movable contactor 161 and fixed contact 163 causes relay 176 to be energized which in turn, through its contacts, causes a reversal of current through the motor windings, thus reversing the direction of the motor and causing the same to drive the support arms in an upwardly direction. The relays are of the type whose contacts drop out immediately upon breaking of the electrical circuit when the movable push button contactor 161 is released by the user, thus providing immediate de-energization of the motor and positive push button control of the lifting gearing.

Figure 10:
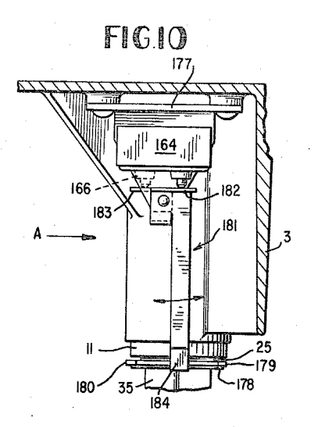
FIG. 10 is an elevational view partly in section taken substantially along line 10—10 of FIG. 6; and particularly showing the arrangement of the support arm limit switch mechanism.
Figure 11:
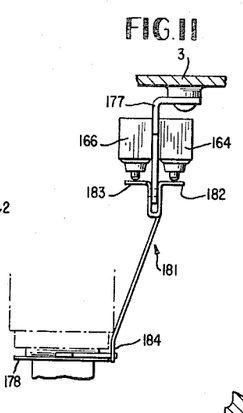
FIG. 11 is a side elevational view of the limit switch arrangement of FIG. 10 looking in the direction of the arrow A.

The upper and lower limit switches 166 and 164, shown particularly in FIGS. 6, 10 and 11, are preferably of the microswitch type and are provided for safety purposes to immediately break the motor circuit and de-energize the same when the pairs of tubular support arms reach a certain maximum upper limit of travel and a certain maximum lower limit of travel when the device is on automatic operation. The safety limit switches 164 and 165 are mounted on a bracket 177 secured to one of the housing sections at a convenient location adjacent the outer end of one of the housing lifting arm bearings. For purposes of illustration in the present drawings, the limit switches have been shown mounted adjacent lower bearing 11. A cam member 178, carrying upper limit cam face 179 and lower limit cam face 180, is rigidly secured to the terminating end of lower tubular member 25 for rotative movement therewith. A limit switch actuating lever 181 is pivotally connected to bracket 177 and is provided with switch actuating portions 182 and 183 disposed in normally contacting relation with the microswitch movable members, and is provided with an extension 184 extending into the path of movement of cam faces 179 and 180. When the Up button of push button switch 160 is depressed, the motor is actuated and the support arms are rotated in an upwardly direction. If the button is held in the depressed position upper limit cam face 179 will be rotated into contact with limit switch actuating lever 181 causing the same to be pivoted on bracket 177, moving switch actuating portion 183 thereof in such manner as to depress the protruding member of upper limit switch 166, thus opening the normally closed limit switch which is connected directly into the motor circuit and causing immediate deenergization of the driving motor. In like manner, if the supporting arm members are driven into their lower safe limit of travel by continuous depression of the Down button of switch 160, lower limit switch 164 is opened causing de-energization of the motor by movement of switch actuating portion 182 into contact with the protruding head of switch 164 when lever 181 is pivoted by lower limiting cam face 180. Thus the limit switches provide positive safety de-energization of the driving motor when the same becomes necessary during automatic operation.

While I have described my invention in certain of its preferred embodiments, I realize that modifications can be made and I desire that it be understood that no limitations upon my invention are intended other than may be imposed by the scope of the appended claims.

What I claim as new and desire to secure by Letters Patent of the United States, is as follows:

1. A lifting and transporting device for incapacitated persons and the like comprising, a wheeled supporting frame, a housing mounted on said supporting frame, a pair of vertically spaced means transversely journaled in said housing for rotation, vertically spaced pairs of parallel support arms connected in opposite ends of said pair of transversely journaled means for movement therewith and extending forwardly of said housing, supporting means carried by and pivoted to the terminating ends of each vertically spaced pair of parallel support arms for engaging the user, gearing disposed in said housing mutually rotatively interconnecting the pair of transversely journaled means of the vertically spaced pairs of parallel support arms, and means connected with said gearing for imparting rotative lifting forces thereto to adjust the elevation of said supporting means and said support arms, whereby said gearing mutually distributes the rotative lifting forces equally between the pair of transversely journaled means and the upper and lower arms of the spaced pairs of parallel support arms.

2. A lifting mechanism for incapacitated persons and the like comprising, support means, a housing mounted on said support means, a pair of vertically spaced means transversely journaled in said housing for rotation, spaced pairs of upper and lower parallel support arms connected in opposite ends of said pair of transversely journaled means for movement therewith and extending forwardly of said housing, supporting means carried by and pivoted to the terminating ends of each spaced pair of upper and lower parallel support arms for engaging the user, gearing disposed in said housing mutually rotatively interconnecting the pair of transversely journaled means of the spaced pairs of upper and lower parallel support arms, and means connected with said gearing for imparting rotative lifting forces thereto to adjust the elevation of said supporting means and said support arms, whereby said gearing mutually distributes the rotative lifting forces equally to the upper and lower arms of the spaced pairs of parallel support arms.

3. A lifting mechanism as set forth in claim 2 in which said pair of vertically spaced means transversely journaled in said housing comprises a pair of tubular members disposed in the same vertical plane and having open ends for receiving the spaced pairs of upper and lower parallel support arms.

4. A lifting device as set forth in claim 2 in which the upper and lower arms of the spaced pairs of parallel support arms are coextensive, and in which said supporting means pivoted to said upper and lower pairs of arms include support heads positioned above said pairs of parallel support arms for engagement beneath the arms of the user, and hand grip means depending beneath said supporting means and said support arms.

5. A lifting device as set forth in claim 4 in which said support heads and said hand grip means are individually vertically telescopically adjustable in said supporting means, and detent locking means carried by said supporting means for retaining said support heads and said hand grip means in selected adjusted positions.

6. A lifting mechanism for incapacitated persons and the like comprising, support means, a housing mounted on said support means, a pair of vertically spaced means transversely journaled in said housing for rotation, vertically spaced pairs of parallel support arms connected in opposite ends of said pair of transversely journaled means for movement therewith and extending coextensively forwardly of said housing, releasable catches connected to the terminating ends of said support arms, generally vertically extending means pivotally connected to the upper and lower parallel support arms on each side of the mechanism by said releasable catches, means carried by said generally vertically extending means for supporting a user intermediate said pairs of parallel support arms, bearing disposed in said housing mutually rotatively interconnecting the pair of transversely journaled means, and means connected with said gearing for imparting equal rotative lifting forces to said pair of transversely journaled means and said spaced pairs of parallel support arms to adjust the elevation of said generally vertically extending means and said support arms, and maintain said generally vertically extending means in the same relative vertical position as said support arms are moved.

7. A lifting mechanism for incapacitated persons and the like comprising, support means, a pair of means transversely journaled for rotation on said support means in vertical spaced relation, vertically spaced pairs of parallel support arms with the arms of each pair of respectively connected in opposite ends of said pair of transversely journaled means for movement therewith and extending forwardly therefrom, supporting means pivotally connected on each side of the mechanism to the terminating ends of the vertically spaced arms for engaging a user, gearing mutually rotatively interconnecting said pair of transversely journaled means, means connected with said gearing for imparting rotative forces thereto for adjusting the elevation of said supporting means and said vertically spaced pairs of parallel support arms, and said gearing disposed to mutually distribute the rotative forces equally between upper and lower arms of the spaced pairs of parallel support arms.

8. A lifting mechanism as set forth in claim 7 and counterbalance means connected with said gearing to prevent counter-rotation thereof when a load is placed on said supporting means.

9. The lifting mechanism as set forth in claim 8 in which said counterbalance means comprises spring means for imparting a variable counter-rotative torque to the said gearing which aids in the lifting operation.

10. A lifting mechanism as set forth in claim 7 in which said pair of means transversely journaled on said support means are tubular members and the ends of opposite parallel support arms of said pairs of vertically spaced arms are movably connected in telescoping relation in opposite ends of the respective tubular members.

11. A lifting mechanism for incapacitated persons and the like comprising, support means, tubular members transversely journaled for rotation on said support means in vertical spaced relation, vertically spaced pairs of parallel support arms with the ends of opposite support arms of said pairs connected in telescoping relation in opposite ends of the respective tubular members for movement therewith and extending forwardly therefrom, supporting means pivotally connected on each side of the mechanism to the terminating ends of the vertically spaced arms for engaging a user, gearing mutually rotatively interconnecting said transversely journaled tubular members, means connected with said gearing for imparting rotative forces thereto for adjusting the elevation of said supporting means and said vertically spaced pairs of parallel support arms, said gearing disposed to mutually distribute rotative forces equally between the upper and lower arms of the pairs of support arms, and movable means connecting interiorly of each tubular member and engaging the telescoping ends of the opposite support arms for effecting simultaneous adjustment of the spacing between opposite parallel support arms when transverse movement is imparted to one of said support arms.

12. A lifting mechanism as set forth in claim 11 and operative means interconnecting the vertically spaced support arms of said pairs of parallel support arms on one side of the mechanism for selectively imparting transverse movement thereto and rotative movement to said movable means to adjust the spacing intermediate oppositely disposed supporting means.

13. A lifting mechanism as set forth in claim 11 in which said movable means is a sprocket wheel journaled interiorly of each tubular member, and a plurality of apertures in the telescoping ends of opposite support arms for engagement by said sprocket wheel.

14. A lifting mechanism for incapacitated persons and the like as set forth in claim 7 in which said means connected with said gearing for imparting rotative forces thereto includes selectively operable electric motor means connected to said support means, and switch means connected for selective operation of said motor means, positioned in close proximity to said supporting means for easy access by the user so that the user himself can selectively control and manipulate the mechanism.

15. A lifting mechanism for incapacitated persons and the like comprising, support means, means transversely journaled for rotation on said support means, vertically spaced pairs of parallel support arms connected in opposite ends of said means for movement therewith and extending forwardly therefrom, supporting means pivotally connected to the terminating ends of the vertically spaced arms of the pairs of parallel support arms on each side of the device for engaging the user, gearing mutually rotatively interconnecting said transversely journaled means, drive means connected with said gearing, selectively operable electric motor drive means connected on said support means, manually rotatable means carried by said support means, clutch means connected to selectively couple said drive means to said electric motor drive means and to said manually rotatable means for rotation thereby to impart rotative movement to said gearing for adjusting the elevation of said supporting means, and said gearing disposed to mutually distribute the rotative forces from said drive means to the vertically spaced pairs of parallel support arms.

16. A lifting mechanism as set forth in claim 7 in which said gearing includes individual drive gears rigidly connected to each transversely journaled means of said pair of transversely journaled means, intermediate gearing journaled for rotation on the respectively oppositely located transversely journaled means of said pair and having a portion thereof connected to said individual drive gears on the oppositely located transversely journaled means, and a portion of said intermediate gearing connected to said means connected with said gearing for imparting rotative forces thereto.

17. A lifting mechanism as set forth in claim 7 in which said gearing is comprised of sprocket wheels and interconnecting endless chains rotatively interconnecting said a pair of transversely journaled means and said means connected with said gearing for imparting rotative forces thereto.

18. A lifting mechanism for incapacitated persons and the like comprising, support means, a housing mounted on said support means, means transversely journaled in said housing for rotation, vertically spaced pairs of parallel support arms connected in opposite ends of said means for movement therewith and extending forwardly of said housing, releasable catches connected to the terminating ends of said support arms, generally vertically extending means pivotally connected to the vertically spaced parallel support arms on each side of the mechanism by said releasable catches, gearing disposed in said housing mutually rotatably interconnecting the transversely journaled means, means connected with said gearing for imparting rotative lifting forces to said support arms, a pair of interchangeable support heads for engagement beneath the arms of a user carried by said generally vertically extending means for supporting a user intermediate said pairs of parallel support arms and said support heads having supporting surfaces offset from their connection with said generally vertically extending means to provide adjustment of the width between opposite supporting surfaces by interchangement of said support heads.

19. A lifting mechanism for incapacitated persons and the like comprising, support means, means transversely journaled for rotation on said support means in vertical spaced relation, vertically spaced pairs of parallel support arms with the arms of each pair respectively connected from opposite ends of said transversely journaled means for movement therewith and extending forwardly therefrom, supporting means pivotally connected on each side of the mechanism to the terminating ends of the vertically spaced arms for engaging a user, spring-biased cable means connected intermediate said pairs of vertically spaced parallel support arms for relieving said arms from twisting movements when under load, gearing mutually rotatively interconnecting said transversely journaled means, means connected with said gearing for imparting rotative forces thereto for adjusting the elevation of said supporting means and said vertically spaced pairs of parallel support arms, and said gearing disposed to mutually distribute the rotative forces equally to the vertically spaced pairs of parallel support arms.

References Cited by the Examiner
UNITED STATES PATENTS 2,539,577   1/51   Hack _______________ 5—81 X
2,991,485   7/61   Schulte ____________ 297—463 X RICHARD C. PINKHAM, *Primary Examiner.*